(12) United States Patent
Casaldaliga et al.

(10) Patent No.: US 10,391,786 B2
(45) Date of Patent: Aug. 27, 2019

(54) PRINT INCONSISTENCY QUANTIFICATION

(71) Applicant: Hewlett-Packard Development Company, L.P., Houston, TX (US)

(72) Inventors: Marcos Casaldaliga, Sant Cugat del Valles (ES); M. Isabel Borrell, Sant Cugat del Valles (ES); Marti Rius, Sant Cugat del Valles (ES); Jordi Sender, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/748,565

(22) PCT Filed: Oct. 30, 2015

(86) PCT No.: PCT/EP2015/075351
§ 371 (c)(1),
(2) Date: Jan. 29, 2018

(87) PCT Pub. No.: WO2017/071781
PCT Pub. Date: May 4, 2017

(65) Prior Publication Data
US 2018/0227460 A1    Aug. 9, 2018

(51) Int. Cl.
*B41J 2/21*     (2006.01)
*B41J 2/045*    (2006.01)
*B41J 2/155*    (2006.01)
*H04N 1/60*     (2006.01)
*H04N 1/407*    (2006.01)
*B41J 29/393*   (2006.01)

(52) U.S. Cl.
CPC .......... *B41J 2/2146* (2013.01); *B41J 2/04508* (2013.01); *B41J 2/155* (2013.01); *B41J 2/2132* (2013.01); *H04N 1/4078* (2013.01); *H04N 1/6041* (2013.01); *B41J 2029/3935* (2013.01); *B41J 2202/20* (2013.01)

(58) Field of Classification Search
CPC ............ B41J 2029/3935; B41J 2/2146; H04N 1/4078
See application file for complete search history.

(56) References Cited

U.S. PATENT DOCUMENTS 5,917,511 A * 6/1999 Ueda ...................... B41J 29/393
                                                  347/14
5,926,617 A * 7/1999 Ohara .................... H04N 17/04
                                                  345/63

(Continued)

OTHER PUBLICATIONS

Anonymous, "TL-5003 Imaging Test Chart Rev 2.0," dated Feb. 1, 2000, retrieved from the Internet [https://www.appliedimage.com/files/yh3ld2/QA-60%20Kodak%20Imaging%20Test%20Chart%20v2-0.pdf] on Jun. 21, 2016, 2 pages.

(Continued)

*Primary Examiner* — Shelby L Fidler
(74) *Attorney, Agent, or Firm* — HP Inc. Patent Department

(57) ABSTRACT

Examples describe a method in which first and second test patterns are printed onto a print medium. The first and second test patterns each vary in print density in opposing directions. A location is determined along the first and second test patterns having at least substantially equal visual density.

14 Claims, 4 Drawing Sheets

(56) References Cited

U.S. PATENT DOCUMENTS

| | | | |
|---|---|---|---|
| 6,020,976 A * | 2/2000 | Fujita | B41J 3/543 |
| | | | 347/3 |
| 6,268,932 B1 | 7/2001 | Lee et al. | |
| 6,851,785 B2 | 2/2005 | Wu et al. | |
| 8,317,293 B2 | 11/2012 | Lill et al. | |
| 8,851,601 B2 | 10/2014 | Zhang et al. | |
| 2001/0026372 A1 * | 10/2001 | Misawa | G06K 15/02 |
| | | | 358/1.9 |
| 2005/0185161 A1 | 8/2005 | Liebig et al. | |
| 2005/0190216 A1 * | 9/2005 | Yamazaki | B41J 29/393 |
| | | | 347/6 |
| 2007/0097159 A1 | 5/2007 | Bastani | |
| 2009/0002414 A1 * | 1/2009 | Shibata | B41J 2/2132 |
| | | | 347/9 |
| 2009/0033703 A1 | 2/2009 | Lee | |
| 2010/0182366 A1 * | 7/2010 | Takagi | B41J 2/145 |
| | | | 347/14 |
| 2012/0013674 A1 * | 1/2012 | Garcia | B41J 2/2132 |
| | | | 347/19 |
| 2017/0087907 A1 * | 3/2017 | Muraji | B41J 2/01 |

OTHER PUBLICATIONS

International Searching Authority, "Search Report," issued in connection with PCT Patent Application No. PCT/EP2015/075351, dated Jul. 1, 2016, 5 pages.

International Searching Authority, "Written Opinion," issued in connection with PCT Patent Application No. PCT/EP2015/075351, dated Jul. 1, 2016, 9 pages.

\* cited by examiner

PRINT INCONSISTENCY QUANTIFICATION

BACKGROUND

In some printing systems regions printed onto a print medium are printed by a respective print unit such as a print head or die. Variations in printing can occur between the outputs of a plurality of print units. For example differences in ink density variation may occur between print head dies which are observed as visual differences between the regions of the printed media.

DETAILED DESCRIPTION

Differences between printed outputs can be quantified by use of the present disclosure. Based on the quantified differences, adjustment to outputs of printing units may be made to reduce variation between the outputs of the printing units.

Figure 1:
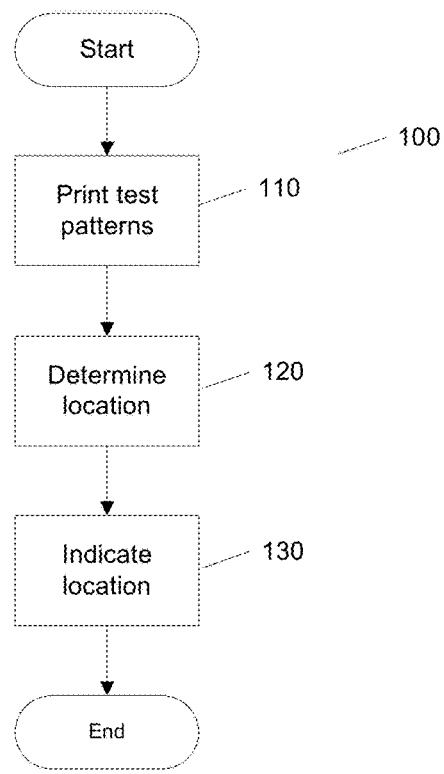
FIG. 1 is an example flowchart of a method which makes use of the present disclosure.
Figure 2:
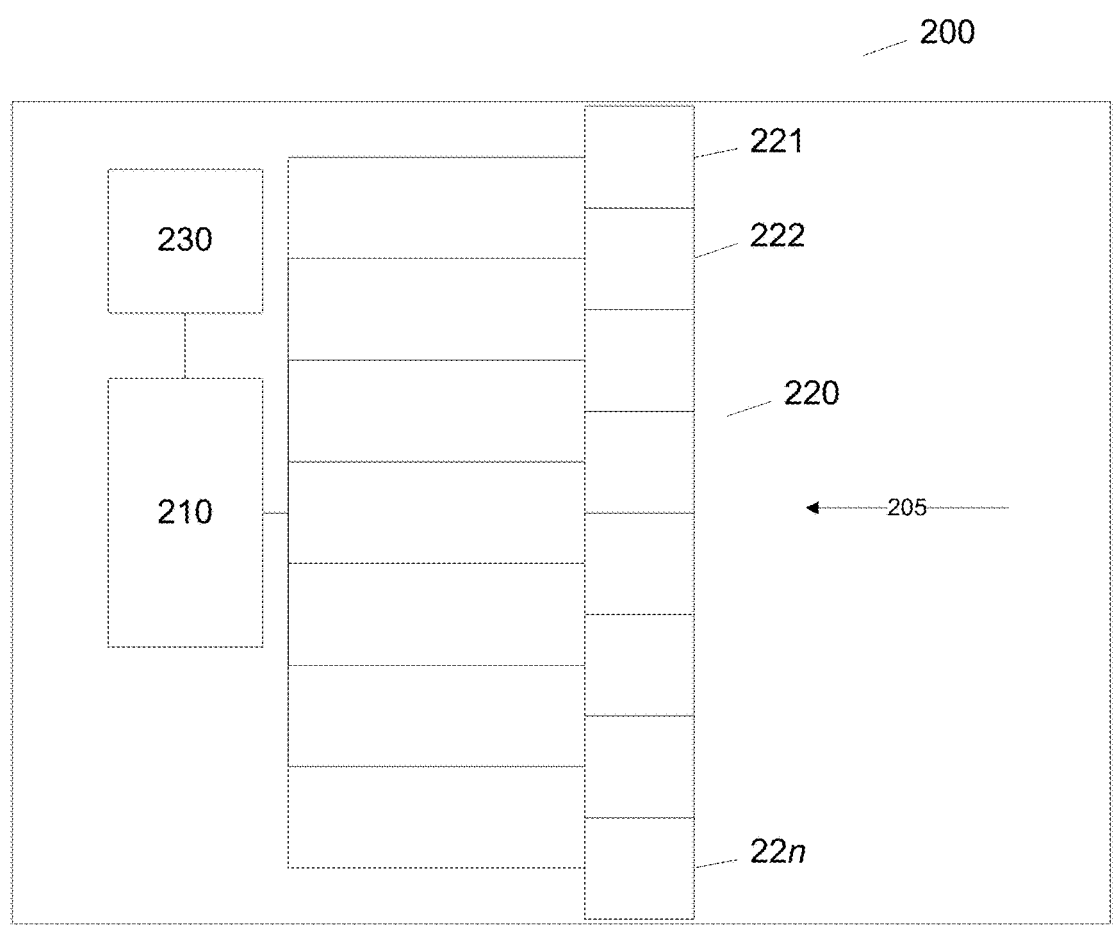
FIG. 2 is a block diagram of an examples printing system which may make use of the present disclosure.

FIG. 1 is an illustration of a method 100 of quantifying printing inconsistencies which makes use of the present disclosure. The method 100 will be explained with reference to FIG. 2 which illustrates a printing system 200 which may make use of the method 100.

The printing system 200 comprises a control unit 210, a plurality of printing units generally labelled as 220, and an interface 230. The plurality of printing units 220 is controlled by the control unit 210 to print onto a print media which may be a substrate such as paper although other substrates are envisaged. The print media may be moved through the printing system 200 in the direction of arrow 205 which indicates a movement direction. The printing units may be print heads, although the example printing system 200 will be explained with reference to the printing units being print dies 221, 222, 22n. The print dies 220 are arranged to eject ink droplets onto the print media under control of the control unit 210 to form an image on the print media. As can be appreciated from FIG. 2, in the example printing system 200 the print dies are arranged in alignment transverse to the direction of movement 205 of the print media and are arranged to substantially span a width of the print media. This arrangement may be known as a page-wide-array (PWA). Each print die 221, 222, 22n, where n is a total number of dies, is arranged to print onto a respective portion of a print medium to form a printed strip parallel with the direction of movement 205 of the print media through the printing system 200.

It will be appreciated that if differences in printing occur between print dies, such as between print dies 221, 222, then these will be appreciable by a viewer of the printed media. For example if print die 221 ejects more ink than print die 222 for a given print density instructed by the control unit 210, a visible difference will exist between the printed region corresponding to print die 221 than region corresponding to print die 222. Since these regions are adjacent then the difference will be noticeable from the printed output. The visible difference may be a difference in darkness or colour between the printed regions, such as observable vertical bands.

Referring again to FIG. 1, the method 100 comprises a process 110 of printing a plurality of test patterns onto a print media. The plurality of test patterns comprise at least first and second test patterns, although further test patterns may be printed, as will be explained. Each of the test patterns may be printed by a respective print unit of the printing system 200, such as a respective print die 221, 222, 22n, onto the print media. Whilst the present disclosure is described with reference to printing a plurality of test patterns onto a print media, it will be appreciated that the overall printed output may be considered as a test pattern which comprises a plurality of portions.

Figure 3:
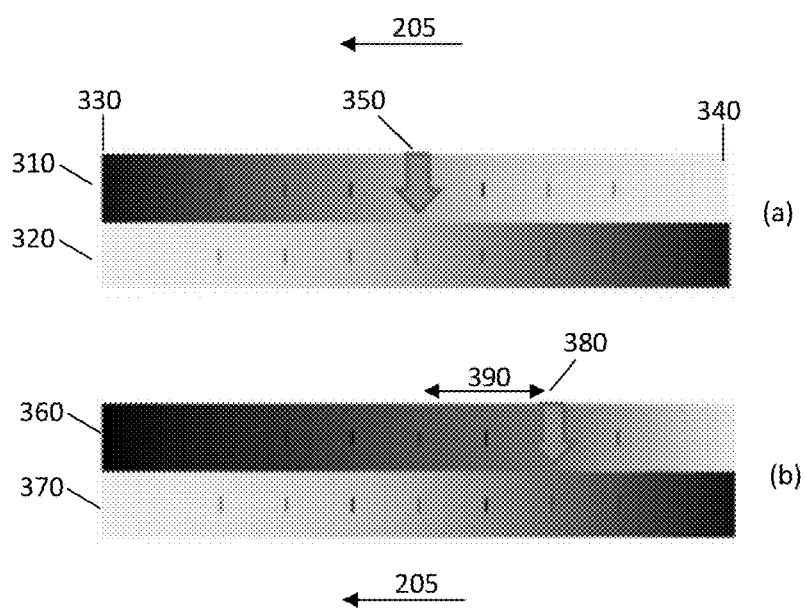
FIG. 3(a) is an illustration of example test patterns which make use of the present disclosure and FIG. 3(b) is a further illustration of example test patterns which make use of the present disclosure.

The first and second test patterns comprise at least a portion which varies in print density in opposing directions. FIG. 3 is an illustration of example test patterns which make use of the present disclosure. FIG. 3(a) illustrates a first test pattern 310 and a second test pattern 320. It will be appreciated that more than two test patterns may be printed. The test patterns 310, 320 are printed parallel to the direction of movement 205 of the print media. The test patterns 310, 320 are elongate parallel to the direction of movement 205. In other words, the longest dimension of each test pattern is parallel to the print direction 205. The test patterns 310, 320 may be printed adjacent on the print media having substantially co-terminus ends. The test patterns 310, 320 may be printed having proximal side-edges. The side-edges of adjacent test patterns 310, 320 may be substantially touching or immediately adjacent.

Figure 4:
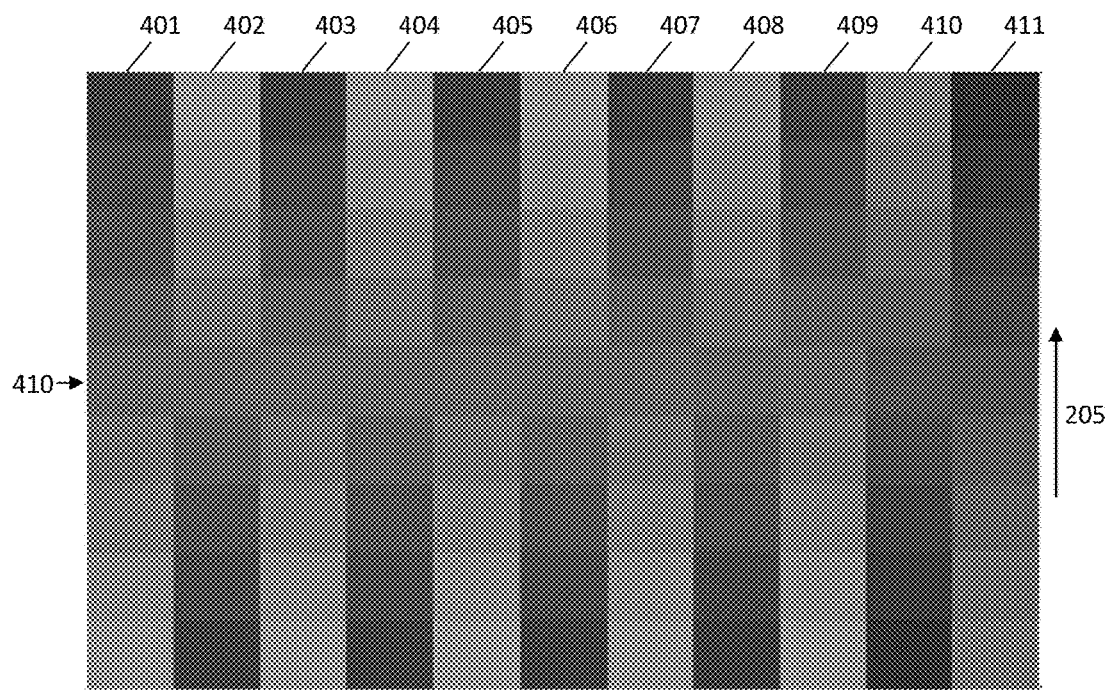
FIG. 4 is an illustration of an example plurality of test patterns which make use of the present disclosure.
Figure 5:
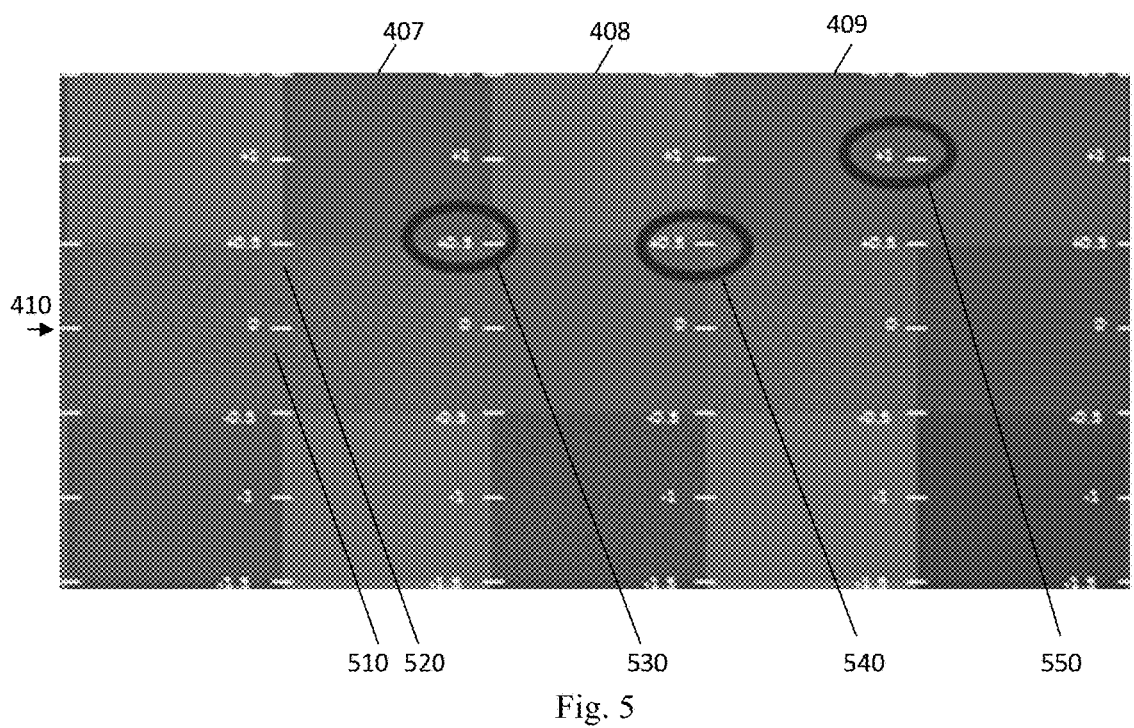
FIG. 5 is an illustration of an example plurality of test patterns and the use of the test patterns as an example of the present disclosure.

The test patterns 310, 320 are colour ramps where a density of printing, such as ink, is increased along the test pattern. Although FIG. 3 illustrates the test patterns 310, 320 printed in black it will be realised that other colour printing may be used. The test patterns 310, 320 may be identical but printed in opposing directions. As illustrated in FIG. 3(a), the test patterns 310, 320 may correspond to a gradually changing print density i.e. a print density curve having a continuous density grading. However, other test patterns 310, 320 may be used which comprise a plurality of portions of predetermined print density. Other words, the test patterns 310, 320 may be formed from a plurality of print density steps. In this way it may be easier for a viewer to observe if a block is the same visual density, such as darkness or colour, as a neighbouring region of another test pattern. Examples are shown in FIGS. 4 and 5, as will be explained. It will be understood that visual density is intended to mean the visual appearance of the test pattern 310, 320 at a particular location which may also be referred to as a darkness, lightness or colour of the test pattern at that location.

As can be appreciated from FIG. 3(a), the first test pattern 310 has a high print density at a first end 330 and a low print density and a second end 340. In contrast, the second test pattern 310 has a low print density at the first end 330 and a high print density and the second end 340. It will be realised that higher print density results in a higher visual density i.e. darker printing and low print density results in lower visual density i.e. lighter printing. The test patterns 310, 320 illustrated in FIG. 3(a) correspond to a colour density curve in which the density of printing varies gradually along the test pattern 310, 320. By comparing colour differences between the test patterns 310, 320 differences in printing density between the respective dies 221, 222 may be determined. The comparison may be performed by a viewer observing the printed media since the human eye is extremely sensitive to colour variations especially between adjacent colours.

The method 100 comprises a step 120 of determining a location at which two or more test patterns 310, 320 have at least substantially equal visual density i.e. darkness or colour. It is understood that by at least substantially equal density it is meant less than or equal to ±5% difference, such as less than or equal to ±2%, such as less than or equal to ±1%, such as less than or equal to ±0.5%, such as less than or equal to ±0.2%, such as less than or equal to ±0.1%, such as less than or equal to ±0.05% difference. With respect to the example shown in FIG. 3(a), in step 120 a location is determined at which the first and second test patterns 310, 320 have at least substantially equal darkness. Arrow 350 indicates a location along the test patterns 310, 320 having at least substantially equal darkness. That is, a location 350 at which the colours of the test patterns 310, 320 match. The arrow 350 in FIG. 3(a) indicates that the test patterns 310, 320 have equal darkness at a central location half-way between the first and second ends 330, 340 of the test patterns 310, 320. By matching at a mid-point of the test patterns 310, 320 it is indicated that the print units responsible for printing the first and second test patterns, such as print dies 221, 222 print with at least substantially equal visual density. If both patterns are identical i.e. printed with equal visual density and printed in opposing directions then the test patterns 310, 320 should match at a mid-point. Thus step 120 may comprise determining a location at which:

$$L^*_{die1} = L^*_{die2}$$

Where $L^*_{die1}$ is a visual density of printing by a first print die, die1, matches a visual density of printing by a second print die $L^*_{die2}$.

The opposing nature of the test patterns 310, 320 allows quantification of differences in printing density. If the test patterns were printed with aligned printing density variation, such that both test patterns have a high density at the same end then, whilst differences in visual density between the test patterns 310, 320 may be observed, these may be difficult to quantify, especially by a user viewing the printed media.

Referring to FIG. 3(b), there are illustrated two test patterns 360, 370, as in FIG. 3(a), printed by first and second print dies, respectively, where the first print die responsible for the first test pattern 360 prints darker than the second print die responsible for the second test pattern 370. As can be appreciated from arrow 380 indicating the location at which the test patterns 360, 370 have equal darkness or colour, the location is off-centre i.e. away from mid-point indicated in FIG. 3(a) by arrow 350. The distance from the mid-point of the test patterns is indicated as 390 which may be referred to as a bias 390. A direction of the bias 390 is indicative of which print die is printing darkest relative to other print die i.e. if the arrow 380 was at a left-hand side of the mid-point this would indicate the second die as printing darker. A magnitude of the bias quantifies a density difference between the dies responsible for printing the first and second test patterns 360, 370.

In step 130, information indicative of the location 350, 380 determined in step 120 is received. The information may be received from the user having observed the printed test patterns to determine the location 350, 380. The information may be received as a user input via the interface 230 of the printing system 200 which may be a user interface. In other embodiments, the user input may be provided to a computing device to which the printing system 200 is communicably coupled via the interface 230, such as a wired or wireless communication interface. Information indicative of the input is then provided from the computing device to the printing system 200 via the interface 230. The received information is provided to the control unit 210 from the interface 230. From the received information, the control unit 210 may be arranged to determine whether colour differences between the test patterns are within a range of allowable variability. The control unit 210 may determine adjustment information for one or more print dies based on the received information. One or both of information indicative of a direction and magnitude of the bias 390 may be used to calculate a correction for printing density of one or more print dies. In this way, a difference in printing density between the print dies may be reduced.

FIG. 4 illustrates a plurality of test patterns 401-411 each printed by a respective print unit of a printing system. In total FIG. 4 illustrates 11 test patterns, although it will be realised that this is merely an example. Test patterns may be printed to cover an entire width of the print media, where a direction of movement of the print media is indicated by arrow 205. The print units, such as print dies, may be arranged to span the print media in a PWA arrangement. As described above, adjacent test patterns are printed to vary in print density in opposing directions. In particular, odd-numbered test patterns 401, 403, 405, 407, 408, 409, 411 are printed to have a print density variation opposed to that of even numbered test patterns 402, 404, 406, 408, 410. Thus, each test pattern has an opposing direction of print density variation to that of its neighbouring test patterns. Furthermore, as described above, the test patterns illustrated in FIG. 4 are comprised of a plurality of portions arranged in the direction of movement 205 of the print media, wherein each portion has a corresponding, different, print density. In this sense the test patterns are arranged as vertical bands (corresponding to the direction of movement 205) formed by a plurality of uniform print density blocks. Each test pattern may comprise an odd number of blocks (z), as will be explained.

A central block, indicated by arrow 410 in FIG. 4, of each test pattern may have a visual density or lightness of $L^*=x$. These central blocks should form a horizontal band of uniform visual density i.e. lightness or colour. Each block vertically from the central block in each test pattern changes according to a print density step of y. Thus blocks vertically adjacent the central block in a test pattern, such as test pattern 401, differ from x in print density by ±y. The table below indicates the print density of blocks in the vertical direction for the even and odd numbered test patterns in FIG. 4.

| Die n, n + 2, n + 4, etc. | Die n + 1, n + 3, etc. |
|---|---|
| $L^* = x - 4y$ | $L^* = x + 4y$ |
| $L^* = x - 3y$ | $L^* = x + 3y$ |
| $L^* = x - 2y$ | $L^* = x + 2y$ |

| Die n, n + 2, n + 4, etc. | Die n + 1, n + 3, etc. |
|---|---|
| L* = x − y | L* = x + y |
| L* = x | L* = x |
| L* = x + y | L* = x − y |
| L* = x + 2y | L* = x − 2y |
| L* = x + 3y | L* = x − 3y |
| L* = x + 4y | L* = x − 4y |

Values of x and y can be selected to maximise accuracy and usability. Furthermore, different values of x and y may be used for different primary colours such as each of CMYK. The value of x may be selected as a reference print density where visual differences are maximized, which may be a mid-tone. The value of y may be selected to cover an expected range of variability. The number of blocks z can be selected to maximize one or both of resolution and usability. Greater number of blocks may provide more resolution. The value of y may be selected inversely proportional to z i.e. so that with a greater number of blocks a smaller change in print density per block is used.

As can be appreciated from FIG. 4, a band of horizontally adjacent portions of test patterns exists indicated by arrow 410 which are of equal visual density or darkness and located at a mid-point of the test patterns 401-407. However the corresponding portion of test pattern 408 differs in visual density i.e. darkness indicating a different print density of the associated print die.

FIG. 5 illustrates a portion of the test patterns shown in FIG. 4. In addition, FIG. 5 illustrates that the test patterns may be printed to include distance markers or a scale. In particular, as illustrated in FIG. 5 each test pattern includes a numerical marker 510, 520 to divide each portion of the respective test pattern at intervals of 0.5 portions. That is, each half-portion is indicated by the numerical scale 510, 520. FIG. 5 illustrates the central region of test patterns 407-408 shown in FIG. 4. As can be appreciated, the central portion of patterns 407 and 408 differs in visual density i.e. darkness. Therefore, step 130 may comprise identifying in the central portion where some visual density is perceived. In those test patterns, this may comprise moving up/down along the test patterns vertically until finding either two portions having the same visual density (in FIG. 5, 409) or when the visual density reduces i.e. the portions becomes lighter (in FIG. 5, 407, 408).

In the case of two portions of the same visual density being side by side 409 the reading from the numerical scale will be the central number of the portions (+1, 550). In the case the portions of similar colour are in diagonal, or there's a change in visual density between top and bottom portions (joins between 407, 408) the reading will be the number in that corner of the portions (+0.5, 530; +0.5, 540).

Figure 6:
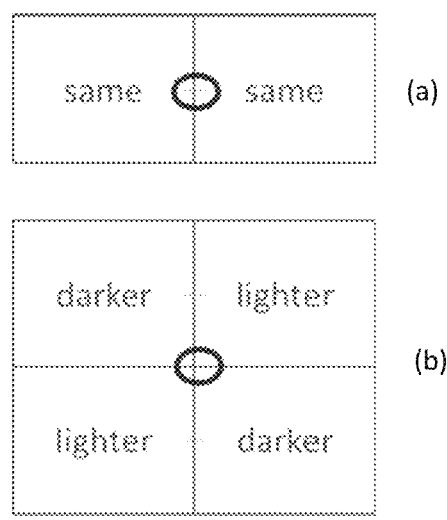
FIG. 6(a) is an illustration of a comparison between first and second test pattern portions having the same visual density at the same location as an example of the present disclosure and FIG. 6(b) is an illustration of a comparison between first and second test pattern portions having the same visual density at offset locations as an example of the present disclosure.

FIG. 6 illustrates use of a numerical scale to indicate differences in visual density. FIG. 6(a) illustrates a case where portions of test patterns generally match in visual density and are horizontally aligned. Thus, a number in a centre of each portion is used to quantify the difference in visual density. FIG. 6(b) illustrates where a change in visual density is located in diagonal alignment. Thus a number between or at a diagonal corner of each portion is used to quantify the difference in visual density.

The numerical indication of the difference in visual density may be provided in step 130 associated with a respective test pattern. Based on an input in step 130 an adjustment to output of printer may be calculated. Thus quantification of printing inconsistency has been described which utilises test patterns arranged in opposing directions.

The present invention provides a non-transitory machine readable storage medium encoded with instructions executable by a processor, the machine-readable storage medium comprising instructions to print first and second test patterns onto a print media, the first and second test patterns each varying in print density in opposing directions, and instructions to receive information indicative of a location along the first and second test patterns having at least substantially equal visual density.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method for quantifying printing inconsistencies, the method comprising:
   printing, using at least one printing unit, first and second test patterns onto a print medium, the first test pattern progressing from less dense to more dense in a first direction and the second test pattern progressing from less dense to more dense in a second direction, the second direction opposite the first direction;
   determining a location along one of the first direction or the second direction at which a first visual density of the first test pattern is at least substantially equal to a second visual density of the second test pattern; and performing a print density correction based on the determined location.

2. The method of claim 1, further including determining a bias distance from a centre of the first and second test patterns to the location.

3. The method of claim 2, further including determining the print density correction based on the bias distance.

4. The method of claim 1, wherein the first and second test patterns include a plurality of portions respectively having a corresponding print density.

5. The method of claim 4, wherein the first and second test patterns includes an odd number of portions.

6. The method of claim 4, wherein the first and second test patterns include a scale associated with the respective plurality of portions.

7. The method of claim 1, wherein the first and second test patterns are printed adjacent on the print medium.

8. The method of claim 1, further including receiving information indicative of the location.

9. A printing system comprising:
a first print unit to print a first test pattern on a print medium, the first test pattern including at least a portion increasing in print density in a first direction;
a second print unit to print a second test pattern on the print medium, the second test pattern including at least a portion increasing in print density in a second direction opposite the first direction; and
a control unit to:
receive information indicative of a location along one of the first direction or the second direction at which a first visual density of the first test pattern is at least substantially equal to a second visual density of the second test pattern,
determine a print density correction based on the location, and
adjust at least one of the first print unit or the second print unit based on the print density correction.

10. A printing system, comprising:
a first print unit arranged to print a first test pattern on a print medium, the first test pattern including at least a portion varying in print density in a first direction;
a second print unit arranged to print a second test pattern on the print medium, the second test pattern including at least a portion varying in print density in a second direction opposed to the first direction;
an interface to receive:
information indicative of a location at which a first visual density of the first test pattern is at least substantially equal to a second visual density of the second test pattern, and
information indicative of a bias distance from a centre of the first and second test patterns to the location, and
a control unit to:
determine a print density correction based on the bias distance, and
adjust at least one of the first print unit or the second print unit based on the print density correction.

11. The printing system of claim 9, wherein the first and second test patterns include a plurality of portions respectively having a corresponding print density.

12. The printing system of claim 9, further including a third print unit and a fourth print unit to respectively print a third test pattern and a fourth test pattern on the print media, wherein the first, second, third and fourth print units are arranged in an array across the print media.

13. A method to determine colour differences between print dies, the method comprising:
using a first print die to print a first test pattern, the first test pattern denser at a first end than at a second end;
using a second print die to print a second test pattern parallel to the first test pattern, the second test pattern denser at the second end than at the first end;
determining a location between the first end and the second end at which a first visual density of the first test pattern is at least substantially equal to a second visual density of the second test pattern; and
performing a print density correction based on the determined location.

14. A non-transitory machine readable storage medium comprising instructions that, when executed, cause a processor to at least perform the method according to claim 1.

* * * * *